United States Patent
Kulkarni et al.

(10) Patent No.: US 12,022,294 B2
(45) Date of Patent: Jun. 25, 2024

(54) ACCESS CONTROL FOR NEAR FIELD COMMUNICATION FUNCTIONS

(71) Applicant: NXP B.V., Eindhoven (NL)

(72) Inventors: Giten Kulkarni, Bangalore (IN); Gulab Chandra Yadava, Bangalore (IN)

(73) Assignee: NXP B.V., Eindhoven (NL)

( * ) Notice: Subject to any disclaimer, the term of this patent is extended or adjusted under 35 U.S.C. 154(b) by 223 days.

(21) Appl. No.: 16/951,450

(22) Filed: Nov. 18, 2020

(65) Prior Publication Data

US 2021/0176629 A1 Jun. 10, 2021

(30) Foreign Application Priority Data

Dec. 10, 2019 (EP) .................................... 19214869

(51) Int. Cl.
| | |
|---|---|
| *H04L 29/06* | (2006.01) |
| *H04W 12/08* | (2021.01) |
| *H04W 12/47* | (2021.01) |
| *G06F 21/35* | (2013.01) |

(52) U.S. Cl.
CPC ........... *H04W 12/47* (2021.01); *H04W 12/08* (2013.01)

(58) Field of Classification Search
CPC ....... H04W 12/47; H04W 12/08; H04W 4/80; H04L 63/101; G06K 7/10257; G06K 7/10316
See application file for complete search history.

(56) References Cited

U.S. PATENT DOCUMENTS

| | | | |
|---|---|---|---|
| 8,903,359 B2 | 12/2014 | Chen et al. | |
| 9,226,143 B2 | 12/2015 | Kilkarni | |
| 9,977,890 B2 | 5/2018 | Alberti et al. | |
| 10,194,318 B2 | 1/2019 | Ballesteros | |
| 2014/0228001 A1* | 8/2014 | Kulkarni ............... | G06F 21/629 455/411 |

(Continued)

FOREIGN PATENT DOCUMENTS

| | | | | |
|---|---|---|---|---|
| EP | 2315170 A1 | 4/2011 | | |
| EP | 2811724 A1 * | 12/2014 | ............. | G06F 21/35 |
| WO | WO-2016026025 A1 * | 2/2016 | ............. | G06F 21/34 |

OTHER PUBLICATIONS

D. Cavdar, E. Tomur; "A practical NFC relay attack on mobile devices using card emulation mode"; 2015 38th International Convention on Information and Communication Technology, Electronics and Microelectronics (MIPRO); Year: May 2015 | Conference Paper | Publisher: IEEE; pp. 1308-1312 (Year: 2015).*

*Primary Examiner* — Shewaye Gelagay
*Assistant Examiner* — Courtney D Fields

(57) ABSTRACT

It is described a method, a control device, and a computer program for enabling/disabling at least one near field communication (NFC) function of a mobile device (MD). It is further described such a MD. The method comprises (a) associating the at least one NFC function to be enabled/disabled with a corresponding secure application (SA) installed in a secure element (SE) system; (b) checking whether the SA complies with a predefined secure condition; (c) if the SA complies with the predefined secure condition, transmitting a notification from the SA to the NFC control system (NFCC) via an interface between the SE system and the NFCC; and (d) enabling/disabling, by the NFCC, the at least one NFC function based on information comprised by the transmitted notification.

14 Claims, 1 Drawing Sheet

(56) References Cited

U.S. PATENT DOCUMENTS

2015/0118958 A1* 4/2015 Jain .................... G06Q 20/425
 455/41.1
2016/0080364 A1* 3/2016 Karimzadeh ......... G06F 21/606
 726/6

* cited by examiner

ACCESS CONTROL FOR NEAR FIELD
COMMUNICATION FUNCTIONS

CROSS-REFERENCE TO RELATED
APPLICATIONS

This application claims priority under 35 U.S.C. § 119 to European Patent Application No. 19214869.0, filed on Dec. 10, 2019, the contents of which are incorporated by reference herein.

FIELD OF THE INVENTION

The present invention relates to the technical field of data and access security for mobile devices being equipped with a Near Filed Communication (NFC) functionality. In particular, the present invention relates to a method, a control device, and a computer program for enabling disabling at least one NFC function of such a mobile device. Further, the present invention relates to such a mobile device.

BACKGROUND OF THE INVENTION

Mobile communication devices, such as smartphones, PDAs, and tablets, are often equipped with various advanced technologies for handling and using sensitive information. An example of such technologies is the combination of an NFC controller and at least one Secure Element (SE) within a mobile (communication) device. This combination may be used for instance in connection with various payment applications which involve the use of sensitive information such as credit card information, bank account numbers, passwords etc. This sensitive information has to be protected but at the same time the applications needs to be able to access the relevant secure functions in order to serve their intended purpose.

In some usage scenario of a combined NFC controller and SE it may be required that certain NFC (controller) function(s), although exposed to all applications installed on the respective mobile device via an Application Programming Interface (API), should be only accessible when certain security or access conditions are met. Exemplary usage scenarios are:

(A) An NFC (controller) function makes sure that a smart card interface of the mobile device is enabled to read a smart card in a specific way. This function in the NFC controller to read smart card may be only be available after specific user authentication and activation procedures have been completed.

(B) An unauthorized host device/host application may read out non secure data from an NFC payment smart card or an NFC enabled mobile device hosting the functionality of such a payment smart card. The information content of such read out data may be equivalent of so called Row 1 & Row 2 data of a magnetic stripe card and may contain the information about e.g. a personal account number, card holder name, expiration date, etc. This information content so mined is a breach of privacy and it is sufficient to prepare clones of the NFC payment smart card or to perform an unauthorized transaction in the absence of the NFC payment smart card. The transaction may be e.g. an internet payment or a manual entry of card info. It is obvious that such an access by an unauthorized host device/host application is to be prevented.

(C) A rogue host device/application could also send commands to the NFC controller to disturb, spy or take over control of the communication happening between the secure application on the SE (e.g. payment reader) and an external smart card (e.g. payment card) via the NFC controller. With such an action a harmful data mining could be realized.

There may be a need for improving the security level for mobile devices being equipped with NFC functionality.

OBJECT AND SUMMARY OF THE INVENTION

This need may be met by the subject matter according to the independent claims. Advantageous embodiments of the present invention are described by the dependent claims.

According to a first aspect there is described a method for enabling-disabling at least one Near Filed Communication, NFC, function of a mobile device having an NFC control system and a Secure Element, SE, system. The described method comprises (a) associating the at least one NFC function to be enabled/disabled with a corresponding secure application installed in the SE system: (b) checking whether the secure application complies with a predefined secure condition; (c) if the secure application complies with the predefined secure condition, transmitting a notification from the secure application to the NFC control system via an interface between the SE system and the NFC control system; and (d) enabling/disabling, by the NFC control system, the at least one NFC function based on information comprised by the transmitted notification.

The described method is based on the idea that the security level for NFC functions of mobile devices can be increased in a comparatively simple but effective manner by controlling the operation of the NFC control system based on information being provided by a SE system of the respective mobile (communication) device. This information is provided by the SE system to the NFC control system with a notification or message which is transmitted via an interface provided between the SE system and the NFC control system. The operational control of the NFC control system is realized by (i) enabling or activating or (ii) disabling or deactivating at least one specific NFC function. This leads to an effective NFC access control of the respective mobile device. This access control depends on the state(s) of the at least one secure application installed in the SE system.

Depending on the specific use case the NFC control system may have an initial state wherein the respective NFC function is enabled or disabled. With the described method the currents status of the respective NFC function can be changed from enabled to disabled or vice versa from disabled to enabled.

In the context of this document the term "NFC function" may particularly denote one NFC functionality of the mobile device which may be desired by a user of the mobile device. Examples for such a functionality may be for instance a user authentication e.g. for entering a restricted area, a capability of performing a payment procedure, etc.

In the context of this document the term "mobile device" may particularly denote a mobile communication device, such as a mobile phone, a smart phone, a personal digital assistant (PDA), a tablet computer, a laptop or any similar device capable of communicating via a data communication network, such as cellular communication network or a wired or wireless data network.

In the context of this document the term "NFC control system" or "NFC controller" may particularly denote any circuitry which controls the operation of the NFC functionality.

This may include in particular a control of Radiofrequency (RF) components driving an RF antenna of the mobile device being used for transmitting NFC signals (over the air). Further, this circuitry may be responsible for processing, the RF signals which have been captured by the RF antenna(s).

In the context of this document the term "SE system" or simply "SE" may particularly denote a Secure Element as specified by the GlobalPlatform standard (see https://globalplatform.org/). The term "SE" may also refer to other forms of secure elements in a mobile system. Such a secure element may be realized with a Universal Integrated Circuit Card (UICC), e.g. a Subscriber Identity Module (SIM) card or a Secure Digital (SD) card, which card is connected to the NFC control system.

In the context of this document the term "secure application" may particularly denote an application which is protected against an unauthorized data access, which may be tried by a hacker. The needed protection may be realized by known keying technology and/or digital certificates. An application may be any program for a mobile device, such as the program applications commonly referred to as "apps" or a remote application residing at a location external to the mobile device (e.g. in a cloud). A "secure application" in the context of this document may also be a signed application which may comprise an installation file or an executable file or program which has been signed with one or more cryptographic keys.

In the context of this document the term "secure condition" may denote any condition which, when being met, indicates a certain level for the data security for at least one entity of a data communication network or any other entity within a communication system. This communication system may be e.g. the internal communication system of the mobile device which "carries" all internal data communication between different internal entities, in particular the NFC control system and the Secure Element system.

In the context of this document the term "notification" or "message may particularly denote any piece of information which is transmitted between (the secure application of) the SE system and the NFC control system. This information is used for enabling/disabling the respective NFC function.

According to an embodiment the notification comprises a secure application identifier. This may provide the advantage that the amount of data comprised in the notification car, be kept small. Hence, realizing the described method does not require a significant increase of the data traffic within the mobile device.

The secure application identifier may be any piece of information which identifies the respective secure application at least within the mobile device in a unique manner.

According to a further embodiment the notification further comprises an action information indicating what action is to be taken by the NFC control system.

The described action information may denote a concrete instruction for the NFC control system which NFC function is to be enabled respectively disabled. This may mean that the notification does not only "give the permission" to enable/disable a certain NFC function. In addition, the notification directly prompts the NFC control system to act accordingly.

It is mentioned that in some embodiments the action to be taken can also be at least implicitly defined by the secure application identifier itself. This means that the secure application identifier is also indicative for the (future) operation of the NFC control system.

According to a further embodiment the method further comprises (a) comparing, by the NFC control system, the transmitted notification with at least a part of an access control list stored in the NFC control system, and (b) recognizing, by the NFC control system, that the transmitted notification corresponds to at least a part of the access control list. The described comparing and recognizing procedure may be seen as to represent an additional data security measure which further increases the security level of the described method.

The access control list may be stored in any suitable memory which is comprised by the NFC control system or which is accessable by the NFC control system. An external accessable memory may be a component of a so-called trusted server.

According to a further embodiment the predefined secure condition comprises that the secure application has been activated by a trusted entity. The trusted entity may be for instance an accessable external trusted server. Alternatively or in combination, the trusted entity may be an internal trusted entity such as a (further) SF system or further secure application Installed in the SE system.

According to a further embodiment the predefined secure condition comprises that the secure application has been authenticated by a trusted entity. Again, the trusted entity may be for instance an accessable external trusted server and/or an internal trusted entity such as a (further) SE system or secure application installed in the SE system.

According to a further embodiment the predefined secure condition comprises a previous reception of a security command by the SB system, wherein the security command has been forwarded by a trusted entity to the SE system via a secure channel. In this embodiment the trusted entity may be an accessable external trusted server. The secure channel may be for instance a VPN data connection.

According to a further embodiment the predefined secure condition comprises a predefined event occurring during an execution of the secure application. The predefined event may be the validity of a timer event (the timer has not yet expired), a predefined status or state of the secure application.

According to a further embodiment the step of associating the at least one NFC function to be enabled/disabled with a corresponding secure application installed in the SF system comprises a dynamic mapping. The described dynamic mapping may be realized by any known mapping procedure.

A preferred dynamic mapping procedure may include (a) assigning an identifier to the NFC function and (b) changing the status respectively the accessibility of the NFC function while the secure application is running on the SE system. Thereby, the secure application may use the (NFC function) identifier and, if applicable, further parameter(s) to change the accessibility. In order to increase the data security level the usage of the (NFC function) identifier by Secure Application can only be changed by a trusted external/internal entity using a secure mechanism.

According to a further embodiment the SF system is realized by means of an internal data processing unit being embedded in mobile device. The data processing unit may be realized with a physical processor or with a functional block of the architecture of a larger data processing device being a part of the mobile device and being responsible for performing also other functionalities of the mobile device.

According to a further embodiment the SE system is realized by means of an external data processing unit being connected to the mobile device. The external data processing unit may be for instance a Universal Integrated Circuit Card (UICC) or a Secure Digital (SD) card which have at least some data processing capabilities and which are communicatively connected with an appropriate (further) interface of the mobile device. The card may be inserted in a corresponding slot such that geometrically the card may be located with (a housing of) the mobile device.

According to a further aspect there is provided a control device for enabling/disabling at least one Near Filed Communication, NFC, function of a mobile device. The provided control device comprises (a) an NFC control system; (b) a Secure Element, SE, system, which is connected to the NFC control system via an interface; and (c) a processor for controlling the operation of the NFC control system and/or of the SE system in such a manner that the method as described above is carried out.

The described control device is based on the idea that by splitting a known NFC and SE overall system into two subsystems, wherein one subsystem is the described NFC control system and the other subsystem is the described SE system, the security level for NFC functions can be increased if the availability of at least one NFC function depends on a successful exchange of a notification between the SE system and the NFC control system.

According to a further aspect there is provided a mobile device enabling a Near Filed Communication, NFC, function. The mobile device comprises a control device as described above and a Radio Frequency, RF, antenna arrangement being connected to the control device such that RF data signals can be exchanged between the NFC control system of the control device and the RF antenna arrangement.

The RF antenna arrangement may be configured (a) for receiving RF electromagnetic radiation from an external NFC apparatus and for forwarding corresponding NFC electric receive signals to the NFC control system and/or (b) tor receiving NFC electric transmit signals from the NFC control system and for converting them into RF electromagnetic radiation to be received by an external NFC apparatus. Alternatively, the mobile device may comprise two RF antenna arrangements, one for receiving RF electromagnetic radiation and the other one for transmitting RF electromagnetic radiation. The external NFC apparatus may be for instance an NFC reader, a Smartphone, a Smartcard, etc.

The mobile device may further comprise an RF matching circuitry which is connected between the control device and the RF antenna arrangement. With the help of the RF matching circuitry the characteristic output impedance of the control device can be adapted at least approximately to the characteristic input impedance of the RF antenna arrangement (and vice versa).

According to an embodiment the mobile device further comprises a second interface for connecting the mobile device to an external entity, in particular via a secure channel.

With the second interface the data security level can be further increased in particular if the external entity is a trusted server which is accessible for the mobile device preferably via the secure channel. The trusted server can be used for instance for activating and/or authenticating the secure application. As has already been mentioned above, the secure channel may be for instance a VPN data connection.

According to a further aspect there is provided a computer program for enabling/disabling at least one Near Filed Communication, NFC, function of a mobile device having an NFC control system and a Secure Element, SE, system. The computer program, when being executed by a data processor, is adapted for controlling and/or for carrying out the method as described above.

As used herein, reference to a computer program is intended to be equivalent to a reference to a program element and/or to a computer readable medium containing instructions for controlling a computer system to coordinate the performance of the above described method.

The computer program may be implemented as a computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Embodiments of the invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

Embodiments of the invention described in this document may also be realized in connection with a "CLOUD" network which provides the necessary virtual memory spaces and the necessary virtual computational power.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the example of embodiment to be described hereinafter and are explained with reference to the example of embodiment. The invention will be described in more detail hereinafter with reference to an example of embodiment bat to which the invention is not limited.

DESCRIPTION OF EMBODIMENTS

Figure 1:
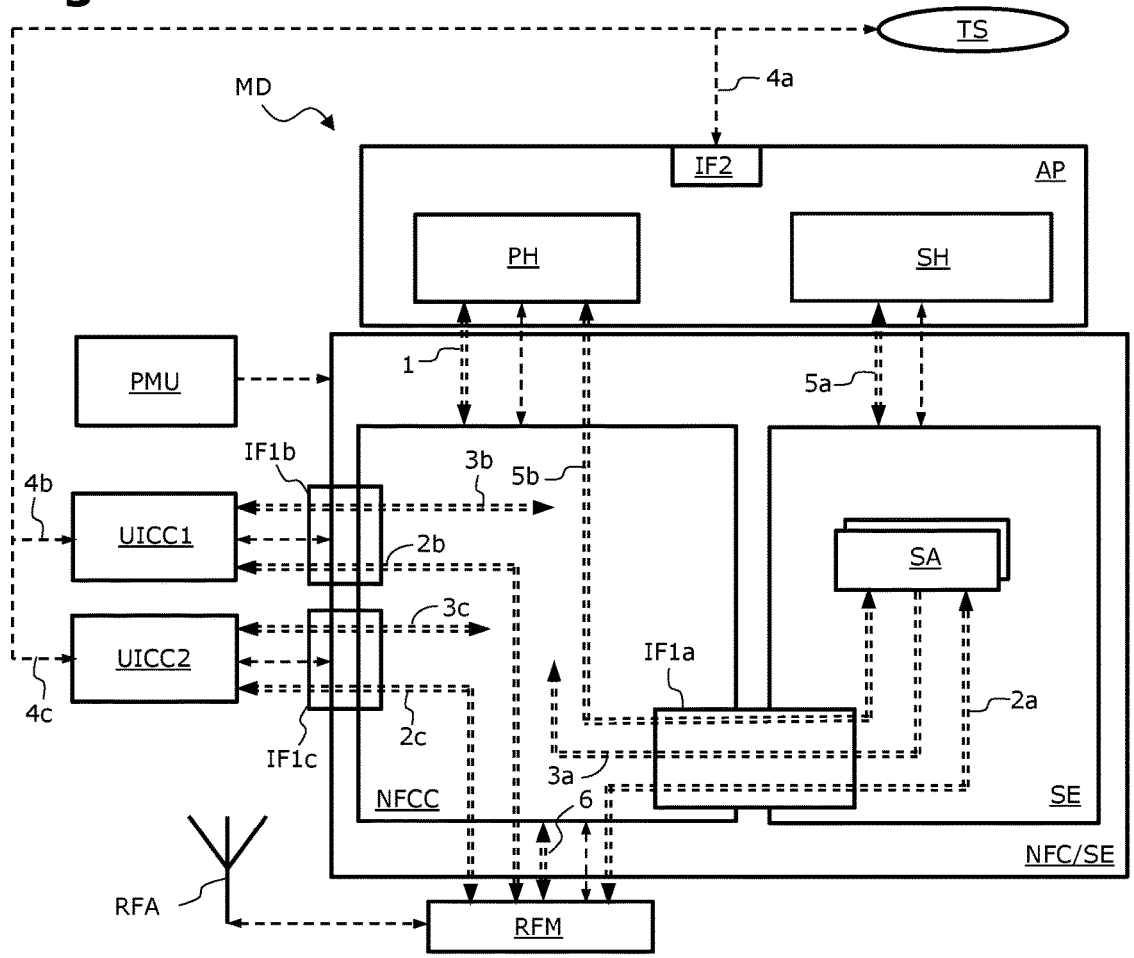
FIG. 1 shows a mobile communication device with an NFC functionality which can be disabled/enabled in accordance with the method described in this document.

The illustration in the drawing is schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a mobile communication device MD in accordance with an exemplary embodiment of the invention. During operation notifications or messages are transfected between different components of the mobile device MD along or via communication paths, signal paths, and/or interfaces, which are depicted with dashed arrows. Communication paths, signal paths, and/or interfaces which are used for carrying out a method for enabling/disabling an NFC function in accordance with the disclosure of this document are depicted with dashed arrows drawn with two lines. Communication paths, signal paths, and/or interfaces, which are used for carrying out known functions of a mobile device are depicted with simple dashed arrows and not denominated with reference numerals.

As can be taken from FIG. 1, the mobile (communication) device MD comprises an application processor AP and a system NFC/SE, which in this document is referred to as a Near Field Communication (NFC) and Secure Element (SE) system. The system NFC/SE comprises an NFC control (sub)system NFCC, which in this document is also referred to as NFC controller. Further, the system NFC/SE comprises a SE (sub)system SE. A first interface IF1a enables a communication between the two (subsystems NFCC and SE. Secure (software) application SA are executed in the (sub)system SE.

The application processor AP comprises respectively hosts a primary host PH, e.g. an Android operation system, and a secondary host SH. The application processor AP further comprises or is connected to a second interface IF2 which allows to communicatively connect the mobile device MD with an external misled server TS via a secure channel 4a. Measures for making the channel 4a secure are well known and are not elucidated in this document in detail. In accordance to the embodiment described here the channel 4a has been made secure by means of a known Virtual Private Network (VPN) software.

As can be further taken from FIG. 1, the mobile device MD comprises several peripheral components such as (i) a power management unit PMU comprising or being connected to a non-depicted battery and (ii) two slots each being configured for receiving a first Universal Integrated Circuit Card UICC1 and a second Universal Integrated Circuit Card UICC2, respectively.

Further, the mobile device MD comprises radio frequency (RF) components being connected to the NFC controller NFCC. Specifically, the RF components include a radio frequency matching unit RFM and a radio frequency antenna arrangement RFA.

In the following the basic concept of the NFC function disabling/enabling procedure described in this document is elucidated:

The system NFC/SE is split, into two (sub)systems. A first subsystem is the non-secure NFC Controller NFCC, the second subsystem is the secured secure element subsystem SE.

During operation, the secure applications SA in the SE subsystem SE or applications on the PH are configured for interacting with non-depicted external NPC readers via the NFC controller NFCC and/or with the external trusted server TS via the application processor AP.

As can be taken from FIG. 1, the primary host PH and the NFC controller NFCC are communicatively coupled via a communication path 1. With suitable information transferred via this communication path 1 all possible NFC functions are exposed to applications running on the application processor AP and in particular running on the primary host PH.

In accordance with the disclosed method an access to some of these NFC functions is required to be secured with a secure application SA. This secure application SA is configured for enabling and/or disabling the respective NFC function. This enabling/disabling is carried out after a notification has been forwarded from the secure element (subsystem SE to the NFC controller NFCC via the communication path 3a (and via interface IF1a) or via the communication path 3b (and via an interface 1b) or via the communication path 3c (and via an interface 1c). Thereby, this notification indicates that the secure application SA complies with a predefined secure condition.

In one embodiment this condition is fulfilled only in case the external trusted server TS communicates securely with the secure application SA, e.g. via the communication paths 4a and 5a (and via the second interface IF2) and/or via the communication paths 4a and 4b (and via the interface IF1b) or via communication paths 4b or 4c (and via the interface IF1c). In another embodiment this condition is fulfilled only when the secure application SA itself reaches a predefined required suite to avoid a misuse of the NFC function e.g. for an unauthorized read or an unauthorized disturbing of the ongoing secure application SA to an external reader transaction. This predefined required state may be for instance a still running non expired timer.

After reception of the (valid) notification from the secure element (subsystem SE the NFC controller NFCC allows the secure application to exchange signals with the radio frequency matching unit RFM respectively with the radio frequency antenna arrangement RFA via a communication path 2a passing through the interface IF1a. Alternatively or in combination, secure applications running on the first Universal Integrated Circuit Card UICC1 and/or on the second Universal Integrated Circuit Card UICC2 may also take benefit from at least one unblocked NFC function. In this case the two Universal Integrated Circuit Cards UICC1 and UICC2 may be connected to the external trusted server TS via the secure channel 4b and the secure channel 4c, respectively. In FIG. 1 the corresponding control signal paths are denominated with reference numerals 3b and 3c, respectively. The corresponding communication paths are denominated with reference numerals 2b and 2c, respectively. The interfaces between the NFC controller NFCC on the one hand and the first Universal Integrated Circuit Card UICC1 and the second Universal Integrated Circuit Card UICC2 on the other hand are denominated with reference numerals IF1b and IF1c, respectively.

In other embodiments, after reception of the (valid) notification from the secure element (sub)system SE, the NFC controller NFCC accepts commands from at least one application running on Use primary host PH. These commands are exchanged via the communication path 1. It is pointed out that before the reception of the (valid) notification such an exchange of commands over the communication path 1 were disallowed or rejected. In yet another embodiment, after reception of the (valid) notification from the secure element (sub)system SE, the NFC controller NFCC accepts commands from an application running on the primary host PH over the communication path 1 in order to exchange signals with the radio frequency matching unit RFM respectively with the radio frequency antenna arrangement RFA via a communication path 6. Prior to reception of the (valid) notification from die secure element (sub)system SE also a communication respectively a data transfer via the communication path 6 was disallowed or rejected.

Figure 2:
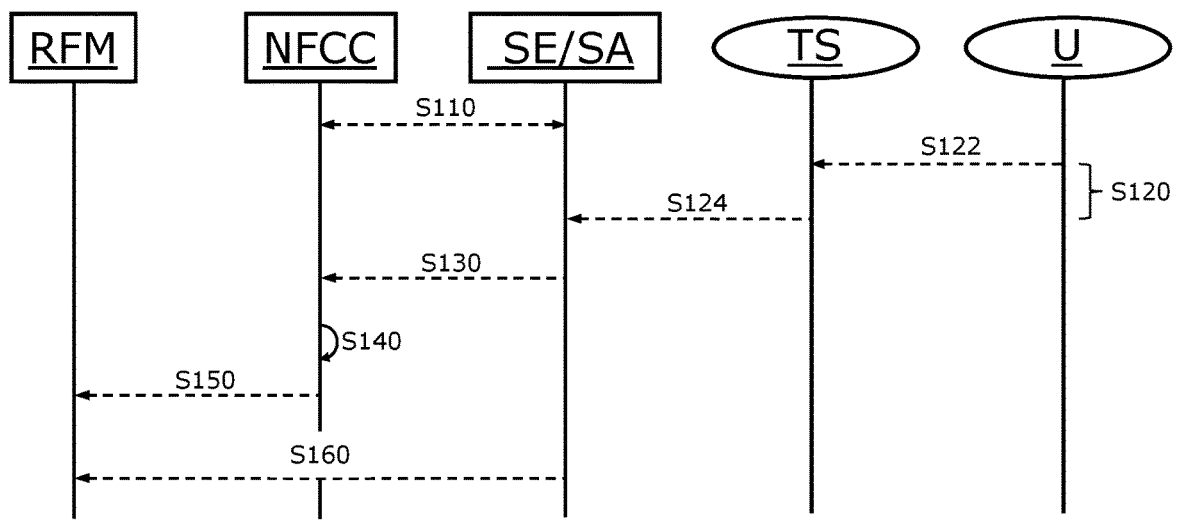
FIG. 2 is a flow diagram illustrating notifications being exchanged when carrying out the method described in this document.

FIG. 2 is a flow diagram illustrating notifications and signals being transferred when carrying out the method described in this document.

The described method starts with a first step S110 in which at least one NFC function is associated with a secure application SA installed on the secure element (sub)system SE. This association may comprise an exchange of one or more notifications between the NFC controller NFCC and the secure element (sub)system SE. In FIG. 2 this association is illustrated by the double arrow S110.

The method continues with a second step S120 in which it is checked whether the secure application SA complies with a predefined secure condition. According to the exemplary embodiment described here the step S120 is realized with two sub-steps, in a first sub-step S122 a user U starting a use case which involves a secured NFC function sends a notification including an activation request to the external trusted server TS. In case of an approval by the trusted server TS the trusted server TS responds in the second sub-step S124 with a notification comprising an activation of the corresponding secure application SA.

It is mentioned that involving the external trusted server TS is not mandatory in the communication flow between the various (logic) entities of the mobile device. In other scenarios the user of the mobile device can directly forward the activation request S122 to the secure element (sub)system SE. In response to the activation of the secure application SA the secure element (sub)system SE forwards in a third step S130 a notification to the NFC control system NFCC. This notification includes information about a specific NFC function, which is to be enabled.

In a fourth step S140 the notification forwarded in the third step S130 is verified. According to the exemplary embodiment described here this is realized with (i) comparing this notification with at least a part of an access control list stored in the NFC controller NFCC and (ii) recognizing that this notification corresponds to at least a part of the access control list. In case of a verification in step S140 the described method continues with a fifths step S150.

In this fifths step S150 the NFC controller NFCC enables the corresponding NFC function by controlling and/or configuring the radio frequency matching unit RFM and/or the radio frequency antenna arrangement RFA in such a manner that the corresponding NFC function can be executed. Alternatively or in combination, (a) the NFC controller NFCC may just unblock an access to the NFC function from the primary host PH and/or (b) an internal state in the NFC controller NFCC may be unblocked.

After enabling the corresponding NFC function NFC signals are exchanged between the secure application SA or application on PH and the radio frequency matching unit RFM respectively the radio frequency antenna arrangement RFA. Alternatively or in combination, an access from an application running on the primary host PH to the NFC control (sub)system NFCC may be enabled. The latter allows (an application of) the primary host PH to exchange information with the radio frequency matching unit RFM and/or the radio frequency antenna arrangement RFA via the NFC control (subsystem NFCC.

Embodiments of the invention described in this document can be descriptively summarized as follows:

An entire NFC system NFC/SE of a mobile device MD consists of an NFC control (subsystem) NFCC and a security certified secure element (sub)system SE, wherein the NFC control (sub)system NFCC is managing an NFC protocol and a state machine indicating the status of the entire NFC system NFC/SE. By contrast thereto, secure content and secure transactions are managed in the secure element (sub)system SE.

The NFC control (subsystem) NFCC is managed by a primary host PH of an application processor AP. NFC functions are generally fully open to (the primary host of) the mobile application access via an Application Programming interface (API) provided by the corresponding mobile platform/operating system (e.g. an Android operating system). In some usage scenarios of the mobile device MD it may be required that certain NFC function(s), although open to all application via host APIs, are enabled only when certain security or access conditions are met.

In this document there is described a mechanism to block (disable) and unblock (enable) NFC functions being accessed from a host application. This mechanism is based on security conditions achieved on the secure element (sub)system SE which notifies the NFC control (sub)system NFCC. In case the security condition is met the corresponding NFC function is enabled. In case the security condition is not met the corresponding NFC function may be disabled.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

REFERENCE NUMERALS

MD mobile (communication) device
AP application processor
NFC/SE NFC and SE system
PH primary host
SH secondary host
IF2 second interface
NFCC NFC control (sub)system/NFC controller
SE secure element (sub)system
IF1a,b,c First interfaces
SA secure application
PMU power management unit
UICC1 first Universal Integrated Circuit Card
UICC2 second Universal Integrated Circuit Card
RFM radio frequency matching unit
RFA radio frequency antenna (arrangement)
TS trusted server
U User
1 communication path PH-NFC
2a, 2b, 2c communication path
3a, 3b, 3c control signal path
4a, 4b, 4c secure channel
5a communication path SH-SA
5b communication path SA-PH
S110 associating NFC function with SA
S120 checking whether SA complies with a secure condition
S122 activation request
S124 activation notification
S130 transmitting notification from SA to NFC control system
S140 verifying notification
S150 enabling NFC function
S160 exchanging signals between SA and RFM/RFA

The invention claimed is:

1. A method for enabling/disabling at least one Near Field Communication, NFC, function of a mobile device having an NFC control system and a Secure Element, SE, system, the method comprising:
associating the at least one NFC function to be enabled/disabled with a corresponding secure application installed in the SE system, wherein the SE system is relatively more secure than the NFC control system;
checking whether the secure application complies with a predefined secure condition, wherein the predefined secure condition is a predefined state of the secure application, wherein the predefined state is reached when the secure application is activated by a trusted entity, and wherein the predefined secure state further comprises authenticating the secure application by the trusted entity,
if the secure application complies with the predefined secure condition:
transmitting a notification from the secure application to the NFC control system via an interface between the SE system and the NFC control system;
enabling/disabling, by the NFC control system, the at least one NFC function based on information comprised by the transmitted notification; and
exchanging NFC signals between the secure application and a radio frequency antenna via the NFC function.

2. The method as set forth in claim 1, wherein the notification comprises a secure application identifier.

3. The method as set forth in claim 2, wherein the notification further comprises an action information indicating what action is to be taken by the NFC control system.

4. The method as set forth in claim 1, wherein the predefined secure condition further comprises a previous reception of a security command by the SE system, wherein the security command has been forwarded by a trusted entity to the SE system via a secure channel.

5. The method as set forth in claim 1, wherein the predefined state comprises a running non-expired timer.

6. The method as set forth in claim 1, wherein associating the at least one NFC function to be enabled/disabled with a corresponding secure application installed in the SE system comprises a dynamic mapping.

7. The method as set forth in claim 1, wherein the SE system is implemented as an internal data processing unit embedded in the mobile device.

8. The method as set forth in claim 1, wherein the SE system is implemented as an external data processing unit connected to the mobile device.

9. The method of claim 1, further comprising:
comparing, by the NFC control system, the transmitted notification with at least a part of an access control list stored in the NFC control system; and
recognizing, by the NFC control system, that the transmitted notification corresponds to at least a part of the access control list.

10. A control device for enabling/disabling at least one Near Field Communication, NFC, function of a mobile device, the control device comprising:
an NFC control system;
a Secure Element, SE, system, which is connected to the NFC control system via an interface; and
a hardware processor for controlling the operation of the NFC control system and/or of the SE system by:
associating at least one NFC function to be enabled/disabled with a corresponding secure application installed in the SE system, wherein the SE system is relatively more secure than the NFC control system;
checking whether the secure application complies with a predefined secure condition, wherein the predefined secure condition is a predefined state of the secure application, wherein the predefined state is reached when the secure application is activated by a trusted entity, and wherein the predefined secure state further comprises authenticating the secure application by the trusted entity,
if the secure application complies with the predefined secure condition:
transmitting a notification from the secure application to the NFC control system via an interface between the SE system and the NFC control system;
enabling/disabling, by the NFC control system, the at least one NFC function based on information comprised by the transmitted notification; and
exchanging NFC signals between the secure application and a radio frequency antenna.

11. The control device of claim 10 further comprising a Radio Frequency, RF, antenna arrangement being connected to the control device, wherein RF data signals are such that RF data signals can be exchanged between the NFC control system of the control device and the RF antenna arrangement.

12. The control device as set forth in claim 11, further comprising an interface for connecting the control device to an external entity, in particular via a secure channel.

13. The control device of claim 10, wherein the hardware processor further controlling the operation of the NFC control system and/or of the SE system by:
comparing, by the NFC control system, the transmitted notification with at least a part of an access control list stored in the NFC control system; and
recognizing, by the NFC control system, that the transmitted notification corresponds to at least a part of the access control list.

14. A computer program comprising instructions embodied in a non-transitory computer readable medium for a method for enabling/disabling at least one near field communication (NFC) function of a mobile device having an NFC control system and a secure element (SE), comprising:
associating the at least one NFC function to be enabled/disabled with a corresponding secure application installed in the SE system, wherein the SE system is relatively more secure than the NFC control system;
checking whether the secure application complies with a predefined secure condition, wherein the predefined secure condition is a predefined state of the secure application, and wherein the predefined state is reached when the secure application is activated by a trusted entity, and wherein the predefined secure state further comprises authenticating the secure application by the trusted entity,
if the secure application complies with the predefined secure condition:
transmitting a notification from the secure application to the NFC control system via an interface between the SE system and the NFC control system;
enabling/disabling, by the NFC control system, the at least one NFC function based on information comprised by the transmitted notification; and
exchanging NFC signals between the secure application and a radio frequency antenna.

* * * * *